United States Patent
Yang

(10) Patent No.: US 10,033,239 B2
(45) Date of Patent: Jul. 24, 2018

(54) ARMATURE FOR ROTATING ELECTRIC MACHINE

(71) Applicant: Hyundai Motor Company, Seoul (KR)

(72) Inventor: Hong Seok Yang, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 271 days.

(21) Appl. No.: 14/955,777

(22) Filed: Dec. 1, 2015

(65) Prior Publication Data

US 2017/0063189 A1     Mar. 2, 2017

(30) Foreign Application Priority Data

Aug. 26, 2015  (KR) .......................... 10-2015-0120269

(51) Int. Cl.
*H02K 3/48* (2006.01)
*H02K 3/52* (2006.01)

(52) U.S. Cl.
CPC ............. *H02K 3/527* (2013.01); *H02K 3/522* (2013.01)

(58) Field of Classification Search
CPC ................................ H02K 3/522; H02K 3/527
USPC ..................... 310/214, 215, 216.001–216.137
See application file for complete search history.

(56) References Cited

U.S. PATENT DOCUMENTS

| | | | |
|---|---|---|---|
| 5,498,916 A * | 3/1996 | Lindner | H02K 3/522 310/214 |
| 5,886,446 A | 3/1999 | Katagiri et al. | |
| 6,225,723 B1 | 5/2001 | Cooper et al. | |
| 2003/0184180 A1 | 10/2003 | Doherty et al. | |
| 2004/0263019 A1 | 12/2004 | Buchan et al. | |
| 2007/0120429 A1 | 5/2007 | Howard et al. | |
| 2015/0076935 A1 * | 3/2015 | Bulatow | H02K 3/487 310/45 |

FOREIGN PATENT DOCUMENTS

| | | |
|---|---|---|
| JP | 2004-312916 A | 11/2004 |
| JP | 2005-184994 A | 7/2005 |
| JP | 2008-017647 A | 1/2008 |
| JP | 2013-208039 A | 10/2013 |
| KR | 2000-0002904 | 2/2000 |
| KR | 10-2015-0120789 A | 10/2015 |

* cited by examiner

*Primary Examiner* — Hanh Nguyen
(74) *Attorney, Agent, or Firm* — Mintz Levin Cohn Ferris Glovsky and Popeo, P.C.; Peter F. Corless

(57) ABSTRACT

An armature for a rotating electric machine is provided. The armature includes a wedge that prevents separation of coils by supporting the coils disposed at left and right sides in a slot while closing an opening in the slot in which the coils are wound is provided. The wedge includes a body portion that is inserted into the slot, and has a "V" shape. Both ends of the body portion are coupled to latch grooves adjacent to a core, and separation prevention portions form bent regions at both ends of the body portion and are integrally connected to the body portion. The separation prevention portions are arranged adjacent to each other in the slot, and support the body portion.

8 Claims, 4 Drawing Sheets

ARMATURE FOR ROTATING ELECTRIC MACHINE

CROSS-REFERENCE TO RELATED APPLICATION

This application claims under 35 U.S.C. § 119(a) the benefit of priority to Korean Patent Application No. 10-2015-0120269 filed on Aug. 26, 2015, the entire contents of which are incorporated herein by reference.

BACKGROUND

(a) Technical Field

The present disclosure relates to an armature for a rotating electric machine and more particularly to an armature for a rotating electric machine which includes a wedge, improved to be more easily assembled.

(b) Background Art

Generally, general, electric machines refer to energy conversion equipment that converts electrical energy into mechanical energy or mechanical energy into electrical energy. Motors and generators are representative examples of such electric machines. Recently, rotating electric machines have been developed in various forms in order to increase the efficiency and power density of the machine. In particular, a plurality of motors and generators are mounted and used within vehicles. For example, drive motors that are driving sources for vehicle motion are mounted within eco-friendly vehicles including electric vehicles, hybrid vehicles, and fuel battery vehicles. Additionally, various motors are used as actuators for various devices or components within the vehicles.

In the related art, a rotating electric machine includes a stator and a rotor. The stator includes a core and a permanent magnet coupled (e.g., attached) to or embedded in the core, and the rotor includes a core and coils wound in the slot of the core. Accordingly, the coils may be disposed at the stator in place of the rotor, and the permanent magnet may be disposed at the rotor in place of the stator. Additionally, both the rotor and the stator may have wound coils, or wound rotor synchronous motor (WRSMs). The portion of a rotor or a stator, around which coils are wound in a rotating electric machine such as a motor or a generator, is called an armature. Therefore, a rotor core or a stator core around which the coils are wound in its slot is an armature core. Additionally, a wedge is used in the armature of the rotating electric machine to fixedly support the position of the coils wound in the slot and to prevent the coils from being separated therefrom.

The above information disclosed in this section is merely for enhancement of understanding of the background of the invention and therefore it may contain information that does not form the prior art that is already known in this country to a person of ordinary skill in the art.

SUMMARY

The present invention provides an armature for a rotating electric machine which includes a wedge for preventing coils from being separated from a slot using an elastic force.

In one aspect in an exemplary embodiment, an armature for a rotating electric machine may include a wedge that prevents separation of coils by supporting the coils disposed at left and right sides in a slot while the slot closes and opens in which the coils are wound, wherein the wedge includes a body portion inserted into the slot, and has a "V" shape. Further, both ends of the body portion may be coupled together to latch grooves adjacent to a core. Separation prevention portions forming bent regions at the both ends of the body portion, and may be coupled (e.g., integrally connected) to the body portion, the separation prevention portions may be positioned (e.g., arranged) adjacent to other within the slot, and supports the body portion.

The wedge may be inserted into the latch grooves by "V" shape of the bent regions, and the latch grooves may have a shape that corresponds to the shape of the bent regions. The wedge may be made of a metal material that has elasticity. Adjacent ends of the separation prevention portions may be rounded in the slot, and the separation prevention portions may maintain a shape of the wedge that supports the body portion to elastically open the body portion. A surface of the wedge in contact with the coils in the slot may be coated with an insulating material, or an insulating material may be disposed between the surface and the coils to maintain insulation between the wedge and the coils.

BRIEF DESCRIPTION OF THE DRAWINGS

The above and other features of the present invention will now be described in detail with reference to exemplary embodiments thereof illustrated the accompanying drawings.

Figure 1:
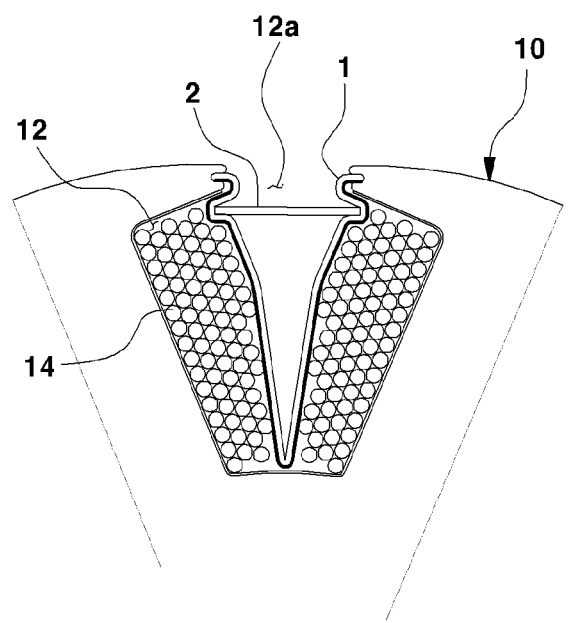
FIG. 1 is an exemplary cross-sectional view illustrating an armature of a rotating electric machine having a conventional wedge installed according to the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is an exemplary cross-sectional view illustrating an armature of a rotating electric machine having a conventional wedge installed. As illustrated in FIG. 1, the wedge assembled within the slot 12 of the core 10 closes (e.g., obstructs) the opening 12a in the slot, fixedly supports coils 14 disposed at the left and right sides within the slot, and prevents the separation of the coils therefrom. The wedge is molded from a typical plastic material. After the coils 14 are wound in the slot 12 within the rotator core 10, the wedge is axially inserted into the slot in the core. Additionally, the wedge has minimal (e.g., low) strength and durability due to the characteristics of the material. Accordingly, in order to resolve improve the strength and durability, a support plate 2 is installed inside a body plate 1. In particular the wedge is enabled to support and open the body plate 1. Further, the support plate 2 is inserted and assembled into the body plate 1 through the narrow opening 12a in the slot. For example, a significant force is required for the insertion of the support plate, and increases the difficulty to efficiently assemble the wedge.

Figure 2:
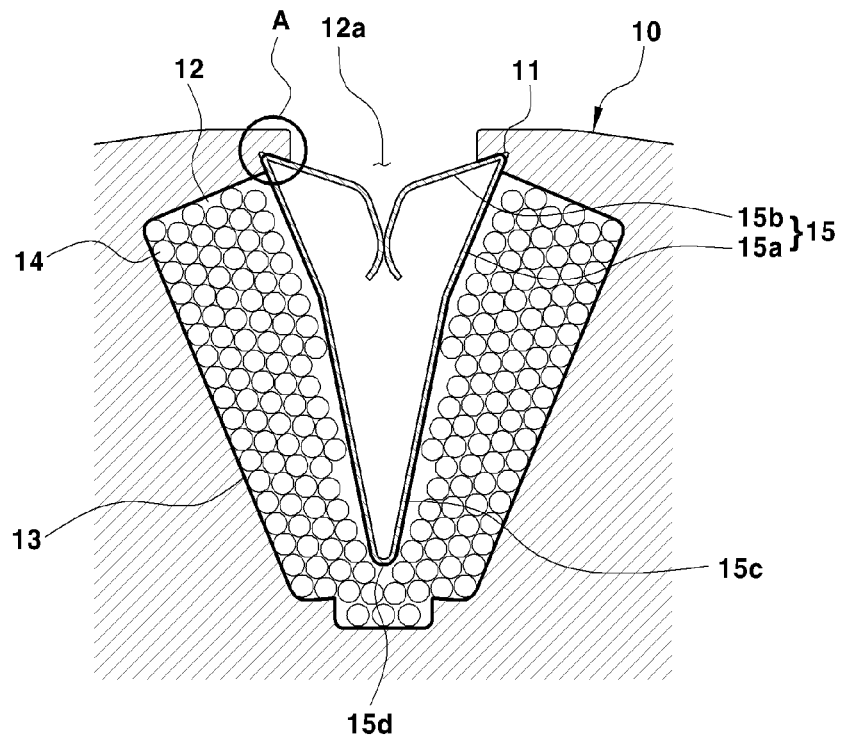
FIG. 2 is an exemplary cross-sectional view illustrating a wedge installed in a slot of an armature of a rotating electric machine according to an exemplary embodiment of the present invention.
Figure 3:
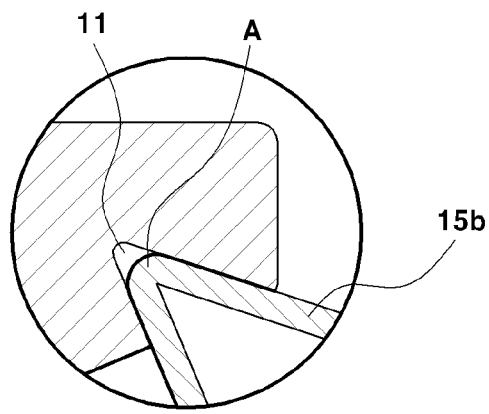
FIG. 3 is an exemplary expanded view illustrating a bent region within the armature of the rotating electric machine according to an exemplary embodiment of the present invention.
Figure 4:
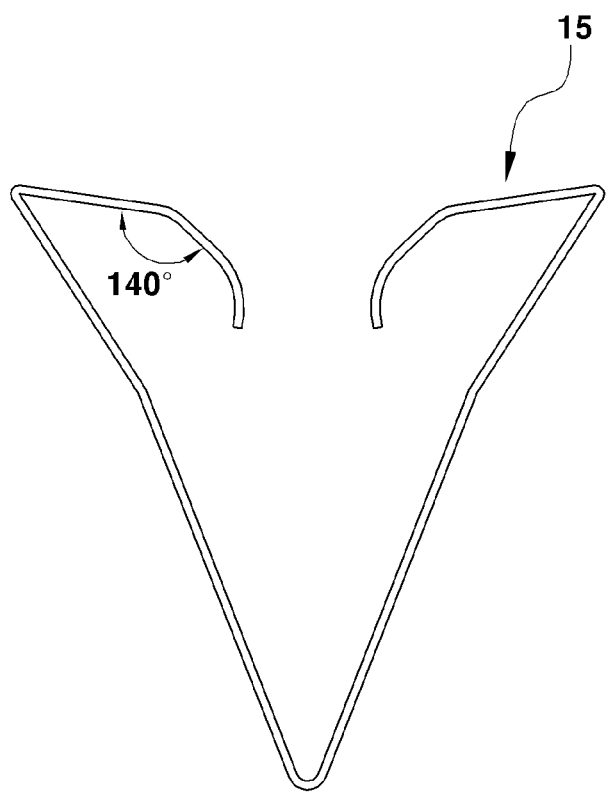
FIG. 4 is an exemplary view illustrating the wedge i separated from the armature of the rotating electric machine according to the exemplary embodiment of the present invention.
Figure 5:
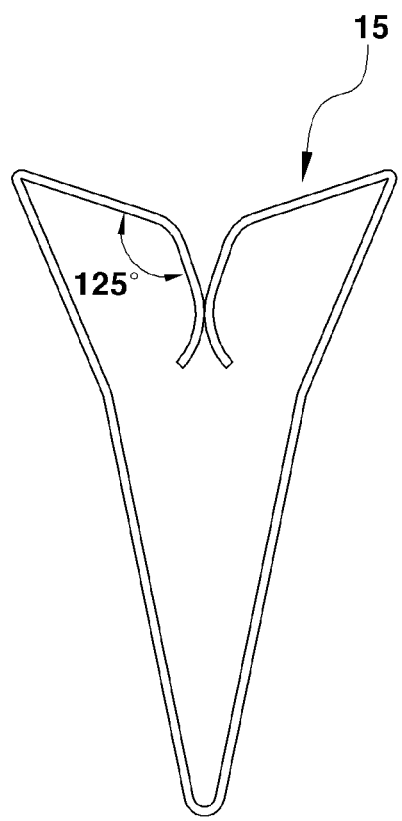
FIG. 5 is an exemplary view illustrating the wedge mounted to the armature of the rotating electric machine according to an exemplary embodiment of the present invention.

FIG. 2 is an exemplary cross-sectional view illustrating a wedge installed in a slot of an armature of a rotating electric machine according to an exemplary embodiment of the present invention. FIG. 3 is an exemplary expanded view illustrating one bent region in the armature of the rotating electric machine according to an exemplary embodiment of the present invention. FIG. 4 is an exemplary view illustrating the wedge separated from the armature of the rotating electric machine according to an exemplary embodiment of the present invention. FIG. 5 is an exemplary view illustrating the wedge mounted to the armature of the rotating electric machine according to an exemplary embodiment of the present invention.

As illustrated in FIG. 2, the rotating electric machine according to an exemplary embodiment of the present invention may include, coils 14 wound within a slot 12 of a core 10, and a wedge 15 that may prevent the separation of the coils 14. Further, the coils 14 may be fixedly supported and may be disposed at the left and right sides while closing (e.g., sealing or obstructing) an opening 12a in the slot 12 and may be assembled within the slot 12 of the armature core 10.

The wedge 15 may have a predetermined shape that may allow separation prevention portions 15b to be integrally connected to a body portion 15a. For example, the body portion 15a may be inserted into the slot 12, and may have a "V" shape. Further, both ends of the body portion 15a may be coupled (e.g., latched or attached) to latch grooves 11 adjacent to the core 10. The separation prevention portions 15b may form bent regions A at both ends of the body portion 15a, and may be coupled (e.g., integrally connected) to the body portion 15a.

The separation prevention portions 15b may be positioned adjacent to each other in the slot 12, and may support the body portion 15a. In particular, the wedge 15, may include the body portion 15a and the separation prevention portions 15b, and may be manufactured with a metal plate that have elasticity and may be formed from an elastic steel material. In other words, the wedge 15 may include the body portion 15a in contact with the coils 14. When both ends of the body portion 15a are proximate to each other about a bent portion 15d, the separation prevention portions 15b, which are bent from both of the ends and are rounded to be disposed adjacent to one another. Further, the separation prevention portions 15b may be manufactured as an elastic body and may be separated (e.g., spaced apart) from each other in the outward direction.

In particular, the wedge 15 may be formed from an elastic steel material. Accordingly the reaction of the elastic steel material may act on the separation prevention portions 15b disposed adjacent to each other and the separation prevention portions 15b may be separated from each other. Additionally, a force may be applied to the body portion 15a coupled to the latch grooves 11, and the wedge 15 may be fixed within the slot 12. Further, the surface of the wedge 15 in contact with the coils 14 in the slot 12 may be coated with an insulating material, or an insulating material such as an insulation paper 13 may be disposed between the surface and the coils. Consequently, the insulation between the wedge and the coils may be maintained.

Furthermore, reference numeral 15c in FIG. 2 refers to an insulation layer formed by the insulation coating or the insulation paper. The wedge 15 may be fixed upon insertion of the bent regions A into the latch grooves 11. As illustrated in FIG. 3, each of the latch grooves 11 may have a predetermined depth to prevent the bent regions A from being separated from the latch grooves 11, and a width which gradually decreases in an inward direction. The latch grooves 11 may include a shape that corresponds to the shape of the bent regions A. For example, since the wedge 15 may be maintained with the bent regions A fitted into the latch grooves 11 by the reaction of the separation prevention portions 15b, the wedge 15 may be maintained fixed within the slot 12.

The process of coupling the wedge 15 having the above configuration into the slot 12 in the armature core 10 will be described. The coils 14 may be wound within the slot 12 of the armature core 10. The ends of the body portion 15a of the wedge 15, as illustrated in FIG. 4, may be positioned proximate to each other about the bent portion 15d and the body portion 15a has a "V" form. The wedge 15 may be radially inserted into the slot 12. In other words, the separation prevention portions 15b may be adjacent to each other, and may be bent from both ends of the body portion 15a, to be proximate to each other. In particular, since reaction as elastic restoring force may be applied between the separation prevention portions 15b positioned adjacent to each other, the bent regions A may apply a pressure to the latch grooves 11. As a result, the wedge 15 may be fixed within the slot 12 when the bent regions A are inserted into the latch grooves 11.

For example, one end of each of the separation prevention portions 15b may form an angle of about 140° with the associated bent region A prior to insertion of the wedge 15 into the slot 12. Since the separation prevention portions 15b may be positioned proximate to each other after insertion of the wedge 15 into the slot 12, one end of each of the separation prevention portions 15b may form an angle of about 125° with the associated bent region A. The bent regions A may be coupled (e.g., fixed) to the latch grooves 11 by the reaction generated in the closed state. When the wedge 15 having the above structure is assembled in the slot 12, the body portion 15a may be fixed (e.g., maintain a fixed position) within the slot 12 that supports the coils 14 disposed at the left and right sides. Additionally, the body portion 15a may close the opening 12a in the slot 12 through the bent portion 15d to securely prevent the separation of the coils 14.

Furthermore, the insulation paper 13 or an insulation film may be disposed between the interior wall surface of the slot 12 of the core 10 and the coils 14 to provide the intended insulation properties, in the armature cores of typical rotating electric machines. Additionally, when the wedge 15 is inserted and assembled into the slot 12, the wedge 15 may be positioned in axial direction rather than in a radial direction. In other words, the body portion 15a may axially slide by fitting the bent regions A into the latch grooves 11.

Consequently, when the wedge 15 that prevents the separation of the coils is installed within the slot 12, the wedge 15 may be fixed within the slot 12 by elasticity based on the shape of the wedge 15 having the bent regions A. A separate support plate 2 may be omitted to be installed to provide structural reinforcement as in the armature of the conventional rotating electric machine described above with reference to FIG. 1. Therefore, the assembly of the wedge 15 may be efficiently improved. The present invention may prevent the coils from being separated from the aperture. For example the elastic force of the separation prevention portions may be bent from and formed at both ends of the wedge adjacent to each other, without a separate configuration. The present invention may prevent coils from being separated from a slot by using the elastic force of separation prevention portions that are bent from and formed at both ends of a wedge adjacent to other, without a separate configuration.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An armature for a rotating electric machine, comprising:
   a wedge that prevents separation of coils by supporting the coils disposed at left and right sides within a slot while closing an opening in the slot in which the coils are wound, wherein the wedge comprises:
   a body portion inserted into the slot, and having a "V" shape, both ends of the body portion being coupled to latch grooves adjacent to a core; and
   separation prevention portions that form bent regions at the both ends of the body portion, and integrally coupled to the body portion, the separation prevention portions positioned adjacent to each other within the slot, and supports the body portion,
   wherein adjacent ends of the separation prevention portions are contacted within the slot and the separation prevention portions maintain a shape of the wedge that support the body portion to open the body portion by elasticity.

2. The armature of claim 1, wherein the wedge is inserted into the latch grooves by "V" shape of the bent regions; and the latch grooves correspond to the shape of the bent regions.

3. The armature of claim 1, wherein the wedge is a metal material having elasticity.

4. The armature of claim 3, wherein adjacent ends of the separation prevention portions are rounded within the slot.

5. The armature of claim 1, wherein a surface of the wedge in contact with the coils in the slot is coated with an insulating material or an insulating material is disposed between the surface and the coils to maintain the insulation between the wedge and the coils.

6. The armature of claim 1, wherein each of the latch grooves have a predetermined depth to prevent the bent regions from being separated from the latch grooves.

7. The armature of claim 1, wherein each of the latch grooves have a predetermined width that gradually decreases in an inward direction.

8. The armature of claim 1, wherein the wedge is inserted and assembled into the aperture in an axial direction.

* * * * *